June 27, 1933. W. MÖBIUS 1,915,374
DEVICE FOR SHIFTING THE WHEELS IN GEAR BOXES
OF LATHES AND OTHER MACHINE TOOLS
Filed May 20, 1930 2 Sheets-Sheet 1

Patented June 27, 1933

1,915,374

UNITED STATES PATENT OFFICE

WALTER MÖBIUS, OF MAGDEBURG, GERMANY, ASSIGNOR TO MAGDEBURGER WERK-ZEUGMASCHINENFABRIK AKTIENGESELLSCHAFT, OF MAGDEBURG, GERMANY

DEVICE FOR SHIFTING THE WHEELS IN GEAR BOXES OF LATHES AND OTHER MACHINE TOOLS

Application filed May 20, 1930, Serial No. 454,156, and in Germany April 24, 1930.

This invention relates to a device for shifting the wheels in the gear boxes of lathes and other tools. These changing devices are generally actuated by shifting a wheel block, the individual wheels of which are brought consecutively into engagement with the wheels on the driven shaft.

In order to enable the meshing of the gear wheels, it was necessary to brake the machine tool until it was almost at a standstill. The disengagement of the drive and braking was mostly effected by levers which had to be separately operated, and there was a danger of the braking being forgotten. It has therefore also been proposed, to connect the changing device for the gear wheels with the brake in such a manner, that the different movements were carried out by a single lever. This kind of braking is also not practical.

According to the invention, however, the disengagement of the machine tool and the braking are effected at the same time as the changing movement for the wheels without another shifting movement being effected as the usual shifting movement by turning a lever through a certain angle. The changing device proper is so constructed, that it serves at the same time for actuating the braking mechanism, in that for example an elbow lever is released at the shifting of the changing rod, which lever shifts a clutch element, thereby disengaging the drive and applying the brake.

Consequently, by this invention the disadvantages in manipulation are obviated, in that the brake is positively connected with the shifting device for the wheel block or the like, so that the braking of the machine tool is effected automatically when changing gear, and wrong changing is thus avoided.

Two embodiments of the invention are illustrated by way of example in the accompanying drawings in which:—

Figure 1:
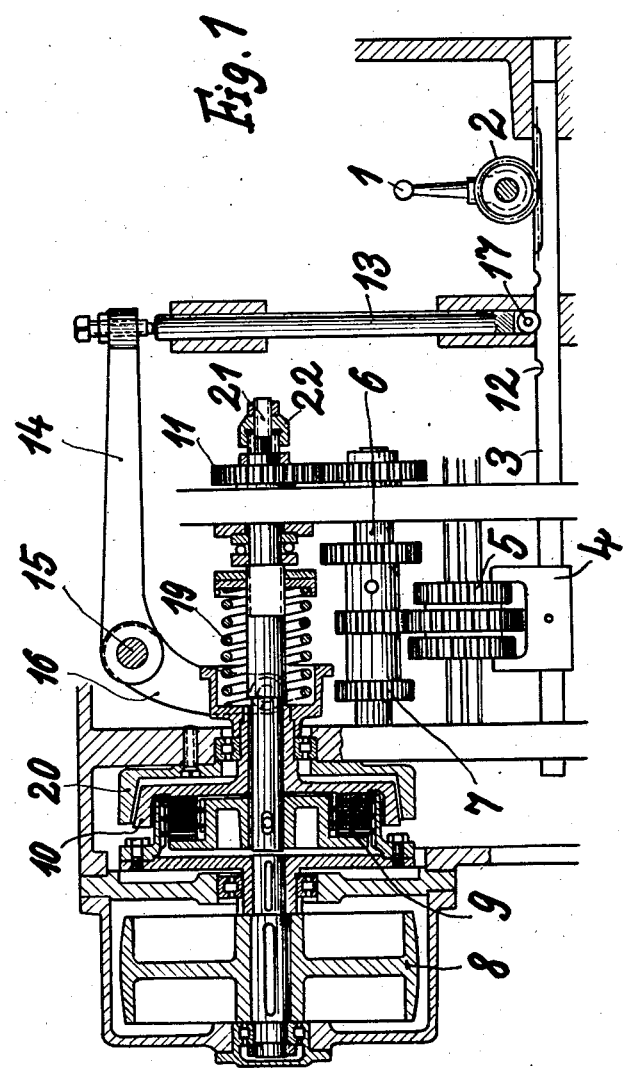

Fig. 1 shows the first form of construction of the braking mechanism and

Figure 2:
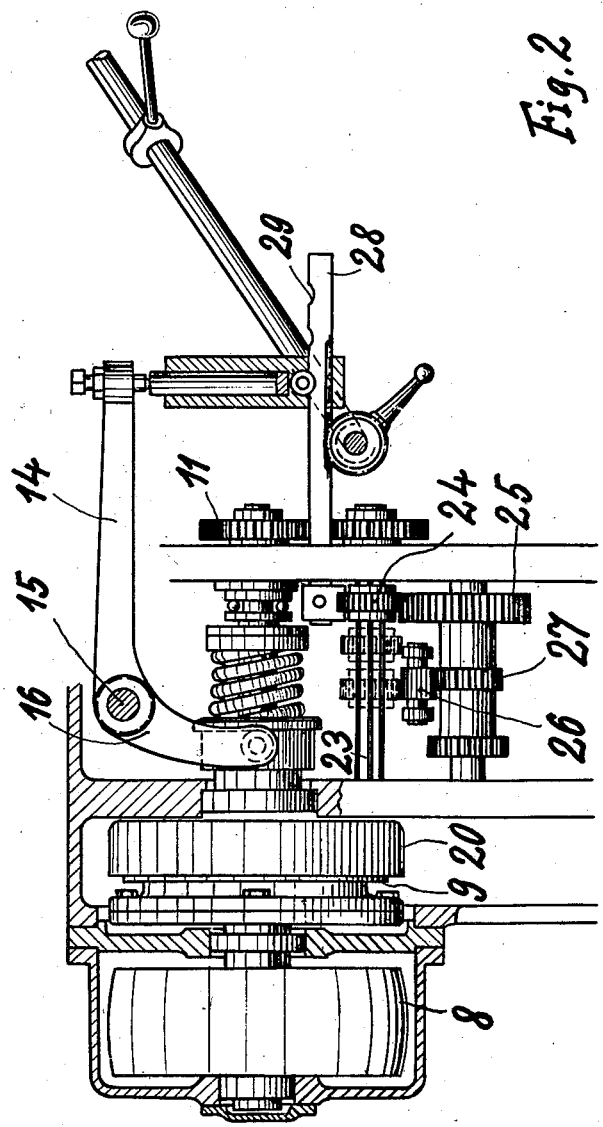

Fig. 2 the second form of this construction.

In the shifting device shown in Fig. 1 the operating lever 1 is connected with a pinion 2, which actuates a striker rod 3. On this rod a fork 4, which carries the wheel block 5, is mounted, which block meshes with the wheels 7 keyed on the shaft 6. The drive is effected for example from the pulley 8 through the laminated clutch 9 and clutch element 10, which is acted upon by the spring 19 and which at the same time is formed as braking surface and adapted to be laid against the brake 20; moreover through the counter shaft 11. The striker rod 3 has a plurality of notches 12, corresponding to the number of speed positions. A lifter rod 13, which actuates the lever 14 keyed on a shaft 15 drops into these notches. A lever 16 connected with the clutch element 10 is also mounted on this shaft.

The arrangement operates in the following manner:—

On the operating lever 1 being operated, the roller 17 mounted on the lifter rod 13 is pressed outwardly. The clutch lever 16 is thereby oscillated and the clutch element 10 shifted, so that the laminated clutch 9 is disengaged and the brake applied. By this means the machine tool is brought almost to a standstill, and its running speed is considerably reduced. This is effected already, when the first pair of gear wheels are still in engagement. On further shifting, the next wheel is brought into engagement and in the last moment before terminating the changing, the lifter rod again drops with its roller into the next notch. Thus the brake is again released and the driving laminated clutch gradually engaged, so that a smooth connection of the drive is once more established.

In order to enable a quick shifting, an instantaneous braking effect is obtained by an accurate adjustment of the clutch and brake. This is attained in that the end 21 of the clutch shaft is provided with a screw thread, on which an adjusting nut 22 is displaceable. By this means the brake and the clutch can be readjusted to compensate for wear. All control levers which actuate the transmissions act on a common clutch and brake and consequently the control levers can be shifted at the same time or in quick succession and in any desired direction.

In the form of construction illustrated in

Fig. 2 the transmission wheels 11 are made interchangeable. On the other hand it is possible in this manner, at a given driving speed, to obtain a reduction for increase of the series of speeds by interchanging the wheels without altering the existing driving relation (speed of rotation, turning moment, belt efficiency or the step wheels) for obtaining the desired revolving speed. The figure shows further the use of the shifting and braking device, when changing the direction of movement, the arrangement serving as reversing gearing.

The sliding wheel 24 is mounted on the axle 23 and engages either directly with the large driven wheel 25 or with the wheel 27 through the intermediary of the gear wheel 26. The control rod 28 has also three notches 29, of which the centre notch, when setting the wheels in the central position that is in disengaged condition, is slightly shallower than the outer notches, so that in this position the laminated clutch can be easily driven. By this means the slidable wheel rotates slowly in this position, in order to find instantaneously, on the disengagement, the tooth engagement by braking.

The wheels 25 and 26 are wider than the reversing wheel 24, in order to allow sufficient time for braking, when changing, so as to obtain a silent changing and to avoid a fracture of teeth.

I claim:—

1. A device for shifting the wheels in gear boxes of lathes and other machine tools comprising in combination a shiftable wheel block, a laminated clutch, a brake, a striker rod provided with notches corresponding to the speed positions of said wheel block adapted to shift said wheel block, a lever adapted to actuate said striker rod, a lifter rod serving as transmission device, adapted to engage in said notches, elbow levers connected to said lifter rod, and a shiftable clutch element of said laminated clutch adapted to be actuated by said lifter rod through the intermediary of said levers said brake adapted to be applied directly after the declutching of said clutch.

2. A device as specified in claim 1, comprising in combination with the clutch, a clutch element, a clutch shaft carrying said clutch element, a spring acting on said clutch element, and a nut on said shaft adapted to regulate the tension of said spring.

3. A device as specified in claim 1, comprising in combination with the clutch and the wheel block, a clutch shaft, interchangeable intermediate wheels adapted to transmit the movement from said wheel block to said clutch shaft.

4. A device as specified in claim 1, comprising in combination with the clutch, a clutch shaft, a driven shaft, a gearing adapted to transmit the movement from said clutch shaft to said driven shaft, a shiftable wheel of said gearing adapted to directly drive said driven shaft, and an intermediate wheel adapted to engage with said sliding wheel and to indirectly drive said driven shaft in the opposite direction, said intermediate wheel being wider than said slidable wheel.

In testimony whereof I affix my signature.

WALTER MÖBIUS.